United States Patent
Hsieh et al.

(10) Patent No.: US 11,361,114 B2
(45) Date of Patent: Jun. 14, 2022

(54) PRIVACY MODE OF DISPLAY SURFACES

(71) Applicant: Hewlett-Packard Development Company, L.P., Spring, TX (US)

(72) Inventors: Hsing-Hung Hsieh, Taipei (TW); Alexander Wayne Clark, Spring, TX (US); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/293,001

(22) PCT Filed: Apr. 2, 2019

(86) PCT No.: PCT/US2019/025274
§ 371 (c)(1),
(2) Date: May 11, 2021

(87) PCT Pub. No.: WO2020/204908
PCT Pub. Date: Oct. 8, 2020

(65) Prior Publication Data
US 2022/0012376 A1  Jan. 13, 2022

(51) Int. Cl.
*G06F 21/84* (2013.01)
*G06F 1/16* (2006.01)
*G06F 3/03* (2006.01)
*G06F 3/048* (2013.01)

(52) U.S. Cl.
CPC ............ *G06F 21/84* (2013.01); *G06F 1/1677* (2013.01); *G06F 1/1616* (2013.01); *G06F 1/1641* (2013.01); *G06F 3/03* (2013.01); *G06F 3/048* (2013.01)

(58) Field of Classification Search
CPC ...... G06F 21/84; G06F 3/1407; G06F 1/1618; G06F 1/1641; G06F 1/1647; G06F 1/1652; G06F 1/1677; G06F 1/1681; G06F 21/6245; G06F 3/013; G06F 3/017; G06F 3/04845; G06F 2200/1637; G06F 2203/04102; G06F 2203/04803; G06F 2221/032; G09G 3/2003; G09G 5/02;
(Continued)

(56) References Cited

U.S. PATENT DOCUMENTS

| | | |
|---|---|---|
| 2010/0321275 A1 | 12/2010 | Hinckley et al. |
| 2011/0143769 A1 | 6/2011 | Jones et al. |
| 2013/0050265 A1 | 2/2013 | de Paz |

(Continued)

FOREIGN PATENT DOCUMENTS

| | | |
|---|---|---|
| EP | 2674834 A2 | 12/2013 |
| EP | 2741173 A2 | 6/2014 |

(Continued)

*Primary Examiner* — Nelson M Rosario
(74) *Attorney, Agent, or Firm* — HPI Patent Department

(57) ABSTRACT

In an example implementation according to aspects of the present disclosure, a computing device includes a first member with a first display surface, and a second member rotatably connected to the first member, the second member including a second display surface. The computing device includes a sensor and a processor to receive sensor data from the sensor. Based on the sensor data, the processor is to select either a privacy mode or a sharing mode for the first display surface, and either the privacy mode or the sharing mode for the second display surface.

18 Claims, 4 Drawing Sheets

(58) Field of Classification Search
CPC ..... G09G 2300/0469; G09G 2320/028; G09G 2358/00; H04W 12/02; H04W 12/67
See application file for complete search history.

(56) References Cited

U.S. PATENT DOCUMENTS

2019/0012000 A1* 1/2019 Cavallaro ............. G06F 1/1677
2021/0089686 A1* 3/2021 He ........................ G06F 1/1677

FOREIGN PATENT DOCUMENTS

| KR | 100577394 B1 | 5/2006 |
|----|--------------|--------|
| KR | 101560718 B1 | 10/2015 |
| WO | WO-2017135749 | 8/2017 |

* cited by examiner

PRIVACY MODE OF DISPLAY SURFACES

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design having two members connected together at a common end via hinges, for example.

DETAILED DESCRIPTION

In some cases, a first or display member of a notebook computer is utilized to provide a viewable display surface to a user while a second or base member includes an area for user input (e.g., touchpad and keyboard). In some cases, in addition to the display member, the base member may also provide another viewable display surface to the user. As a result, two display members may be rotatably connected to each other to provide a dual screen display, with one of the display members also serving as a base member.

Examples disclosed herein provide the ability to selectively enable privacy mode for display surfaces of computing devices, according to an example. As an example, the computing device may refer to a notebook computer with a dual screen display, as described above. As will be further described, the privacy mode may be independently enabled for each display surface, based on various parameters or conditions. As a result, the user experience may be improved, as privacy mode for a display surface may be enabled as the user intends, while the other display surface, for example, may remain in sharing mode.

Figure 1:
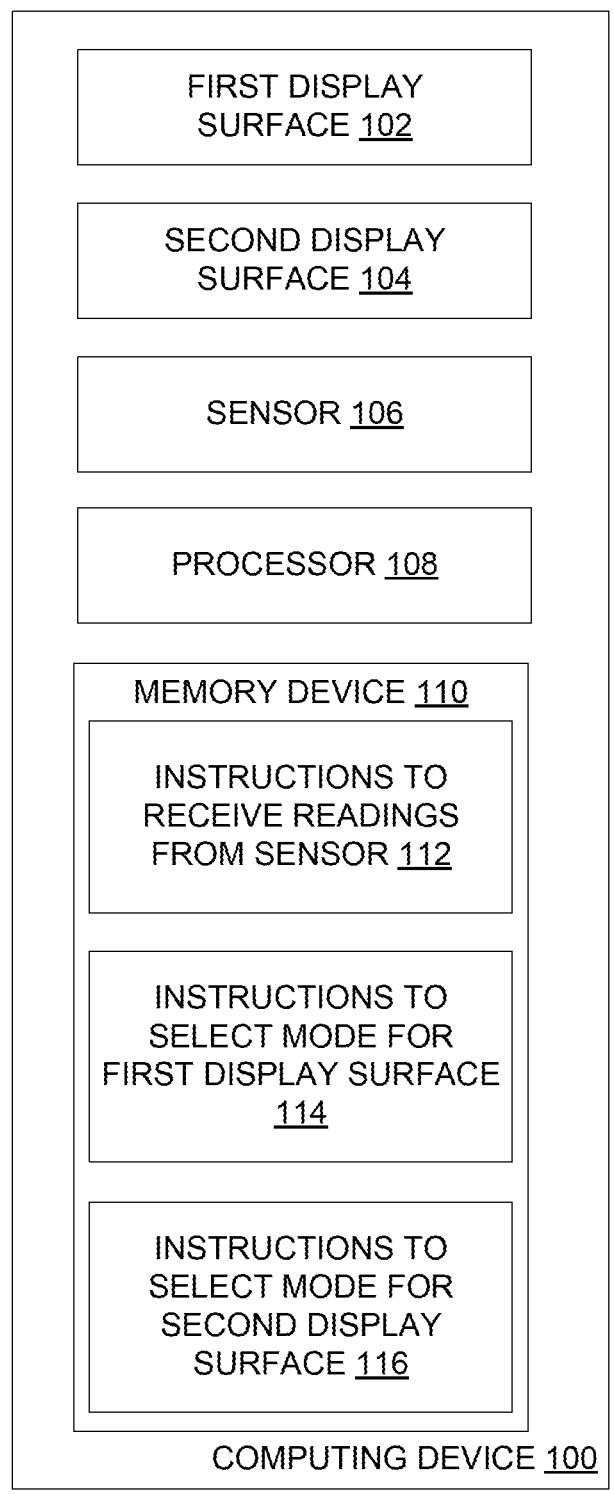
FIG. 1 illustrates a computing device for selectively enabling privacy mode for display surfaces of the computing device, according to an example.

With reference to the figures, FIG. 1 illustrates a computing device 100 for selectively enabling privacy mode for display surfaces 102, 104 of the computing device 100, according to an example. Examples of the computing device 100 include, but are not limited to, notebook computers with dual screen displays, as described above. For example, the computing device 100 may include a first member with the first display surface 102, and a second member rotatably connected to the first display member, with the second display surface 104.

As will be further described, each display surface may independently switch between privacy mode, where the angle at which viewing the display surface may be limited, and sharing mode, where a wider angle is available for viewing content illustrated on the display surface. As a result, while in privacy mode, content from a display surface may not be viewable outside a certain angle, known as privacy angle. By independently controlling the mode selected for each display surface, privacy may be ensured for a first display surface, while a second display surface may remain in sharing mode. This may be the preferred arrangement, for example, while the computing device 100 is operated in laptop mode. As an example, when a user is using a laptop, the eyes of the user may be in front of the hinge up display (e.g., first display surface 102) and the viewing angle is normal. However, the viewing angle to the C-deck display (e.g., second display surface 104) may be larger than its privacy angle. As a result, in order to avoid the user from not being able to see the content of the C-deck display, for example, while being used in laptop mode, the C-deck display may remain in sharing mode, which allows for a wider viewing angle.

The computing device 100 depicts a processor 108 and a memory device 110 and, as an example of the computing device 100 performing its operations, the memory device 110 may include instructions 112-116 that are executable by the processor 108. Thus, memory device 110 can be said to store program instructions that, when executed by processor 108, implement the components of the computing device 100. The executable program instructions stored in the memory device 110 include, as an example, instructions to receive readings from sensor 106 (112), instructions to select mode for first display surface 102 (114), and instructions to select mode for second display surface 104 (116).

Instructions to receive readings from sensor 106 (112) represent program instructions that when executed by the processor 108 cause the computing device 100 to receive readings from sensor 106 that provides various parameters or conditions of the computing device 100. Based on the data collected by the sensor 106, determinations may be made to select either privacy mode or sharing mode for each display surface.

Upon receiving readings from sensor 106, instructions to select mode for first display surface 102 (114) represent program instructions that when executed by the processor 108 cause the computing device 100 to select either the privacy mode or the sharing mode for the first display surface 102. Similarly, instructions to select mode for second display surface 104 (116) represent program instructions that when executed by the processor 108 cause the computing device 100 to select either the privacy mode or the sharing mode for the second display surface 104, based on the sensor readings.

As will be further described, the determination whether to enable sharing mode or privacy mode for a display surface may depend on various parameters or conditions detected by the sensor 106. For example, the determination to select either privacy mode or sharing mode for a display surface may be made based on a combination of the operation mode of the computing device 100 (e.g., first or second orientation) and the hinge open angle, for example, between the first and second members of the computing device 100. In addition, rather than depending on the combination of the operation mode of the computing device 100 and the hinge open angle, the determination to select either privacy mode or sharing mode for a display surface may be made based on user presence, for example, in the vicinity of the computing device 100. As an example, the decision to choose between the sharing mode or privacy mode may be enabled when a privacy hot key is toggled, for example on the computing device 100.

Memory device 110 represents generally any number of memory components capable of storing instructions that can be executed by processor 108. Memory device 110 is non-transitory in the sense that it does not encompass a transitory signal but instead is made up of at least one memory component configured to store the relevant instructions. As a result, the memory device 110 may be a non-transitory computer-readable storage medium. Memory device 110 may be implemented in a single device or distributed across devices. Likewise, processor 108 represents any number of processors capable of executing instructions stored by memory device 110. Processor 108 may be integrated in a single device or distributed across devices. Further, memory device 110 may be fully or partially integrated in the same device as processor 108, or it may be separate but accessible to that device and processor 108.

In one example, the program instructions 112-116 can be part of an installation package that when installed can be executed by processor 108 to implement the components of the computing device 100. In this case, memory device 110 may be a portable medium such as a compact disc (CD), digital versatile disc (DVD), or flash drive or a memory maintained by a server from which the installation package can be downloaded and installed. In another example, the program instructions may be part of an application or applications already installed. Here, memory device 110 can include integrated memory such as a hard drive, solid state drive, or the like.

FIGS. 2A-D illustrate a computing device 200 for selectively enabling privacy mode for display surfaces 206, 208 of the computing device 200, based on a combination of the operation mode of the computing device 200 and the hinge open angle, for example, between the first member 202 and second member 204 of the computing device 200, according to an example. The computing device 200 includes a first member 202 with a first display surface 206, and a second member 204 rotatably connected with the first member 202, with a second display surface 208.

As an example, a first sensor 210 may be used to determine the operation mode of the computing device 200, for example, whether it is being operated in a first or second orientation. In addition, a second sensor 212 may be used to determine the opening angle or hinge open angle 214 between the first member 202 and second member 204 of the computing device 200. The placement of the sensors 210, 212 may vary. For example, the second sensor 212 may be disposed within the hinge connecting the first and second members 202, 204 to each other, as illustrated. In addition, the number of sensors used may vary. For example, a single sensor may be used for determining the orientation of the computing device 200 and the hinge open angle. As an example, sensors, such as an accelerometer and a gyroscope, may be used alone or in combination the detect the orientation and hinge open angle.

Figure 2A:
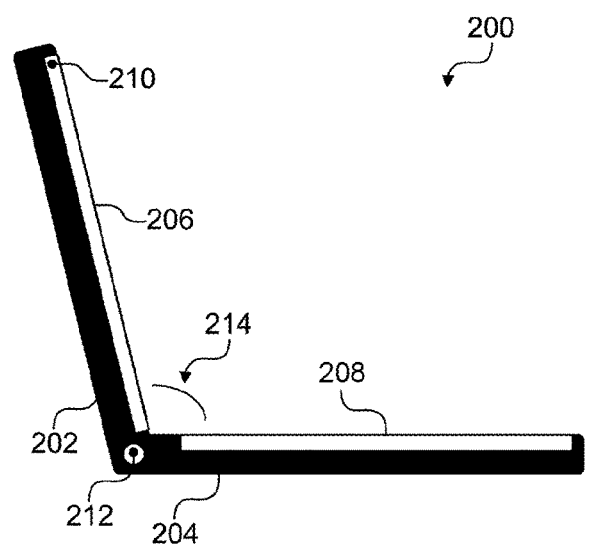
FIGS. 2A-D illustrate a computing device for selectively enabling privacy mode for display surfaces of the computing device, based on a combination of the operation mode of the computing device and the hinge open angle, according to an example.
Figure 2B:
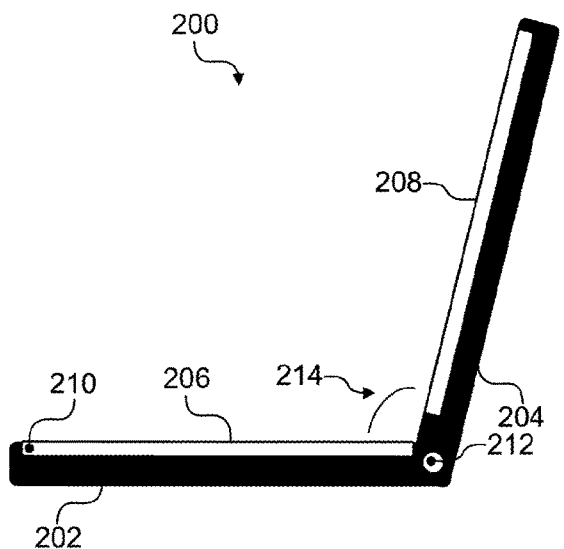
Figure 2C:
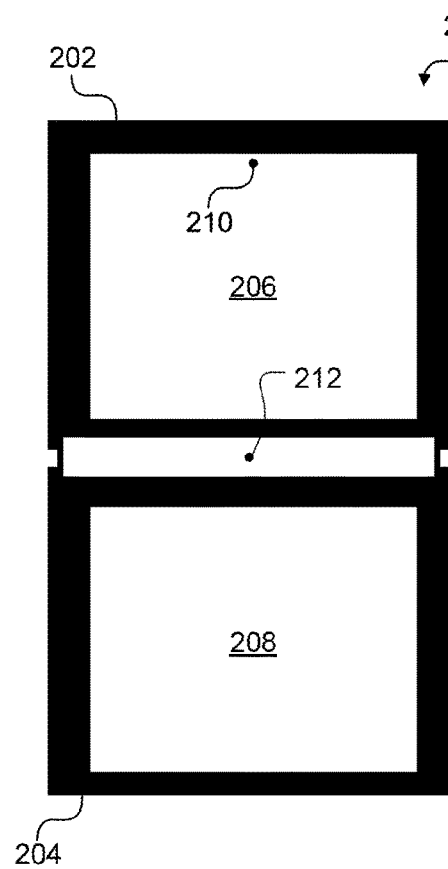

As the computing device 200 is utilized, the operation mode, or orientation of the computing device 200 may vary, in addition to the hinge open angle 214, as illustrated in FIGS. 2A-D. For example, FIGS. 2A-C illustrate the computing device 200 used in a first operation mode, or laptop mode. As both the first member 202 and second member 204 include display surfaces, either member may be used as the primary display member, while the other member is used as the base member. For example, first member 202 may be used as the primary display member in FIG. 2A, while second member 204 is used as the primary display member in FIG. 2B. Referring to FIG. 2C, the computing device 200 may be used with the hinge open angle at 180 degrees.

Figure 2D:
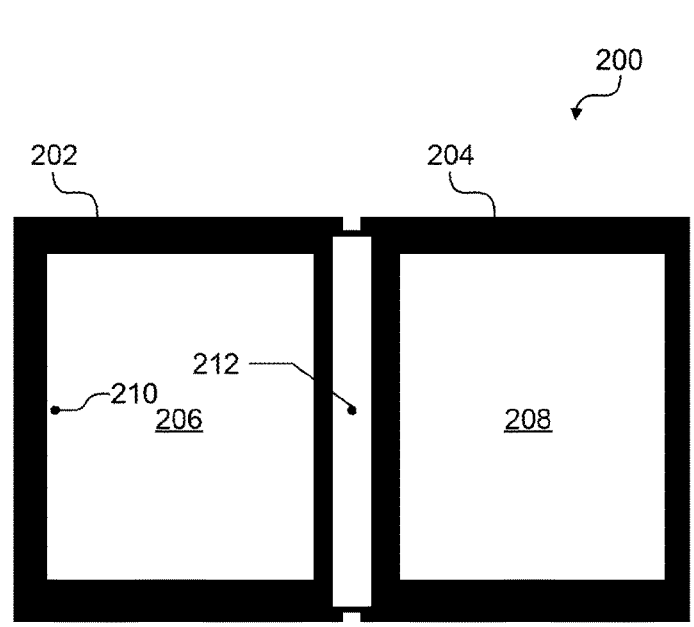

Referring to FIG. 2D, the computing device 200 may be used in a second operation mode, such as handheld mode or book mode.

Referring to FIG. 2A, sensor 210 determines that the computing device 200 is being used in a first orientation or operating mode (e.g., laptop mode), with the first display surface 206 as the hinge up display, as an example. Sensor 212 may then determine the hinge open angle or opening angle 214. As an example, if the opening angle 214 is less than a threshold value, privacy mode may be selected for first display surface 206 and sharing mode selected for second display surface 208. As an example, the threshold value is 135 degrees, and if the computing device 200 is operated in the laptop mode with the opening angle 214 ranging between 0 to 135 degrees, the modes of the display surfaces 206, 208 may be selected as mentioned. As described above, by keeping the C-deck display, second display surface 208 in this instance, in sharing mode, a wider viewing angle is available for a user to view content from the second display surface 208 while the computing device is operated in laptop mode.

Referring to FIG. 2B, sensor 210 determines that the computing device 200 is being used in laptop mode as well, but with the second display surface 208 as the hinge up display. As a result, if the opening angle 214 ranges between 0 to 135 degrees, privacy mode may be selected for the second display surface 208 and sharing mode selected for the first display surface 206.

Referring to FIG. 2C, upon determining that the computing device 200 continues to be used in laptop mode, for example, via sensor 210, if sensor 212 then detects that the opening angle is greater than the threshold value, or exceeds the threshold value, privacy mode may be selected for both the first display surface 206 and the second display surface 208. As illustrated, the opening angle is 180 degrees, exceeding the 135 degree threshold value mentioned above. However, the threshold value may vary. With the opening angle exceeding the threshold value, the user is likely able to view content from both display surfaces while in privacy mode, as content from both display surfaces may be viewable within the privacy angle. As a result of switching a display surface between sharing mode and privacy mode, content displayed on the display surface remains private while a user is likely able to view the content within the privacy angle (e.g., hinge open angle greater than a threshold value), and also becomes available to user to view when likely viewing the display surface outside the privacy angle (e.g., hinge open angle less than the threshold value).

Referring to FIG. 2D, sensor 210 determines that the computing device 200 is being used in a second orientation or operating mode (e.g., handheld mode or book mode), as an example. While in this mode, the user is likely holding the computing device 200 in their hands, as a book. As a result, the eyes of the user may be in front of both the first display surface 206 and the second display surface 208. With the eyes in front of both display surfaces, privacy mode may be selected for both the first display surface 206 and the second display surface 208, irrespective of the hinge open angle, as the viewing angle of both display surfaces may remain within the privacy angle.

Figure 3:
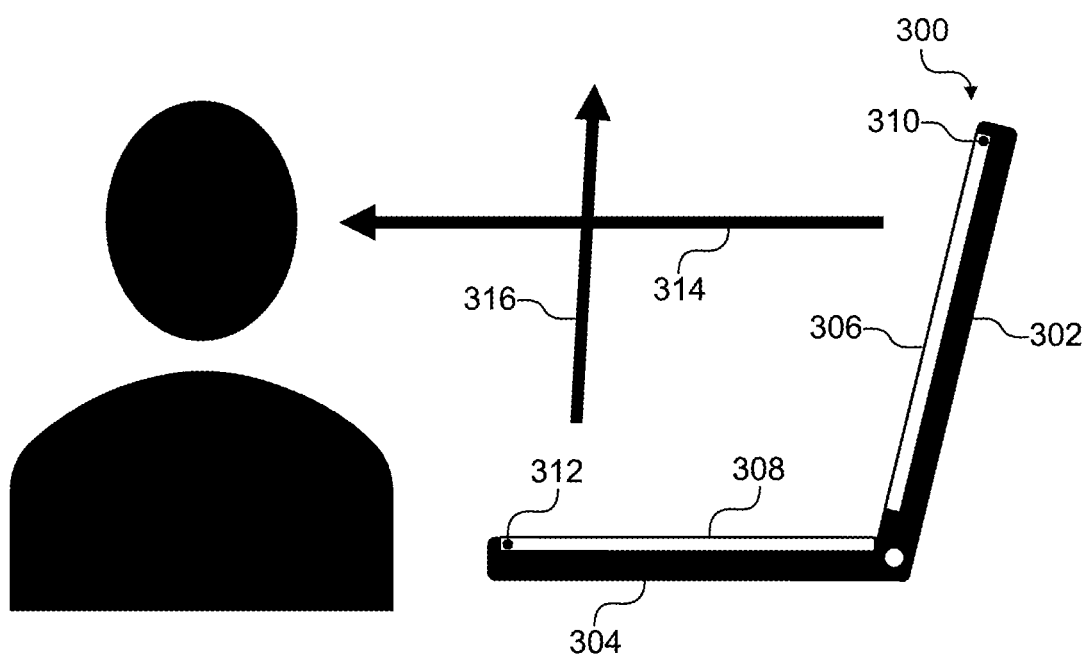
FIG. 3 illustrates a computing device for selectively enabling privacy mode for display surfaces of the computing device, based on user presence, according to an example.

FIG. 3 illustrates a computing device 300 for selectively enabling privacy mode for display surfaces 306, 308 of the computing device 300, based on user presence, for example, in the vicinity of the computing device 300, according to an example. The computing device 300 includes a first member 302 with a first display surface 306, and a second member 304 rotatably connected with the first member 302, with a second display surface 308.

As an example, a first sensor 310 may be disposed within the first member 302, to determine whether there is a user presence in front of the first display surface 306. Similarly, a second sensor 312 may be disposed within the second member 304, to determine whether there is a user presence in front of the second display surface 308. As an example, the area for determining user presence may depend on the privacy angle, for example, when privacy mode is enabled, and whether user presence is detected within the privacy angle. Although separate sensors are illustrated, the number of sensors to determine user presence for both display surfaces may vary. For example, a single sensor may be used to determine user presence for both display surfaces. Examples of sensors for detecting user presence include, but are not limited to, time-of-flight sensors, passive infrared sensors, mm wave detector sensors, and image sensors.

By determining whether there is user presence in front of a display surface, if the user is in front of the display surface, the viewing angle of the display surface may remain within the privacy angle, allowing for the display surface to switch to privacy mode, hiding content from other viewers of the display surface. As described above, each display surface may independently switch between privacy mode and sharing mode, based on user presence. Referring to FIG. 3, first sensor 310 may detect user presence in front of first display surface 306, indicated by arrow 314. However, second sensor 312 may not detect user presence in front of the second display surface 308, indicated by 316. As a result, privacy mode may be selected for the first display surface 306, and sharing mode may be selected for the second display surface 308. Therefore, the user may still be able to view content from the second display surface 308, even though they may be outside the privacy angle of the second display surface 308.

As an example, if the computing device 300 is held in book mode (e.g., see FIG. 2D), user presence may be detected by both sensor 310 and sensor 312, thereby switching both display surfaces 306, 308 to privacy mode, allowing for only the user to view content from them. As an example, relying on user presence to selectively enable privacy mode may be used alone or in combination with the other embodiments described above.

Figure 4:
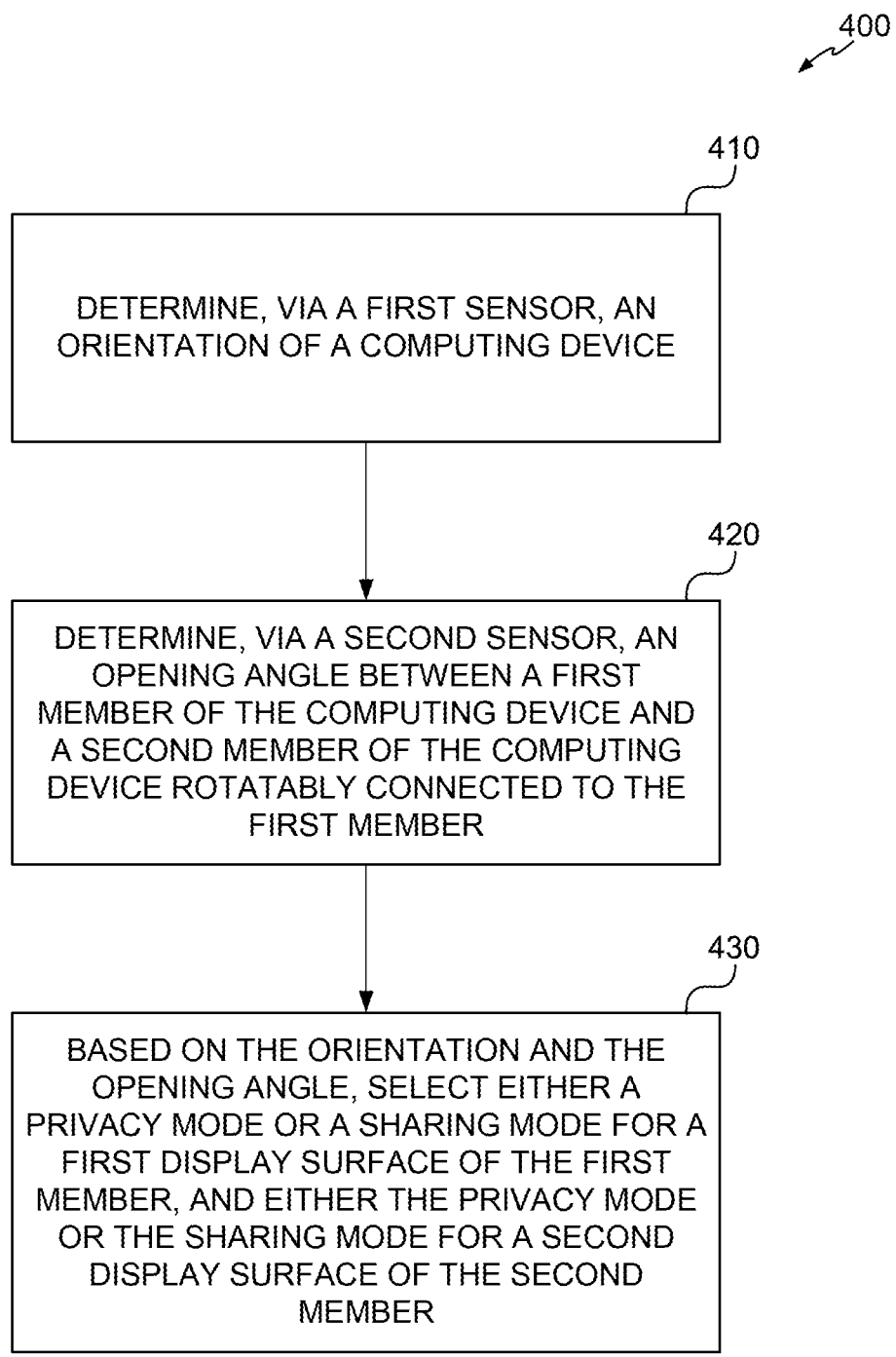
FIG. 4 is a flow diagram in accordance with an example of the present disclosure.

FIG. 4 is a flow diagram 400 of steps taken by a computing device to implement a method for selectively enabling privacy mode for display surfaces of the computing device, according to an example. Although the flow diagram of FIG. 4 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

At 410, the computing device determines, via a first sensor, an orientation of the computing device. As an example, the orientation of the computing device may correspond to an operating mode of the computing device, such as laptop mode or book mode. At 420, the computing device determines, via a second sensor, an opening angle between a first member of the computing device and a second member of the computing device rotatably connected to the first member.

At 430, based on the orientation and the opening angle, the computing device selects either a privacy mode or a sharing mode for a first display surface of the first member, and either the privacy mode or the sharing mode for a second display surface of the second member. For example, if the first sensor determines that the computing device is in laptop mode, and the second sensor determines the opening angle is less than a threshold vale (e.g., 135 degrees), the computing device selects privacy mode for the first display surface, and sharing mode for the second display surface. However, if the second sensor determines that the opening angle is greater than the threshold value, the computing device selects privacy mode for both the first and second display surfaces.

Rather than the laptop mode, if the first sensor determines that the computing device is in book mode, the computing device may select privacy mode for both the first display surface and second display surface, irrespective of the opening angle, as the viewing angle of both display surfaces may remain within the privacy angle, as described above.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A computing device comprising:
    a first member comprising a first display surface and a first sensor disposed within the first member;
    a second member rotatably connected to the first member, wherein the second member comprises a second display surface and a second sensor disposed within the second member; and
    a processor to:
        receive first sensor data from the first sensor and second sensor data from the second sensor;
        determine, using the first sensor data, whether there is a user presence in front of the first display surface;
        determine, using the second sensor data, whether there is a user presence in front of the second display surface;
        select a privacy mode for the first display surface in response to detecting the user presence in front of the first display surface using the first sensor data;

select the privacy mode for the second display surface in response to detecting the user presence in front of the second display surface using the second sensor data;

select a sharing mode for the first display surface in response to no longer detecting the user presence in front of the first display surface using the first sensor data; and select the sharing mode for the second display surface in response to no longer detecting the user presence in front of the second display surface using the second sensor data.

2. The computing device of claim 1, wherein the processor is to:

determine, using sensor data from an orientation sensor, an orientation of the computing device; and select the privacy mode or the sharing mode for the first display surface or the second display surface further based on the orientation.

3. The computing device of claim 1, wherein the first sensor or the second sensor comprises a time-of-flight sensor.

4. The computing device of claim 1, wherein the first sensor or the second sensor comprises an infrared sensor.

5. The computing device of claim 1, wherein the first sensor or the second sensor comprises an electromagnetic sensor.

6. The computing device of claim 1, wherein the first sensor or the second sensor comprises an image sensor.

7. The computing device of claim 1, wherein in the privacy mode, content on the first display surface is not viewable at a first viewing angle outside a privacy angle that is a viewing angle, and wherein in the sharing mode, content on the first display surface is viewable at the first viewing angle outside the privacy angle.

8. A non-transitory computer-readable storage medium comprising program instructions which, when executed on a processor of a computing device, cause the computing device to:

receive sensor data from a sensor of the computing device;

based on the sensor data:

select either a privacy mode or a sharing mode for a first display surface of a first member of the computing device, wherein in the privacy mode, content on the first display surface is not viewable at a first viewing angle outside a privacy angle that is a viewing angle, and wherein in the sharing mode, content on the first display surface is viewable at the first viewing angle outside the privacy angle, and select either the privacy mode or the sharing mode for a second display surface of a second member of the computing device, the second member rotatably connected to the first member, wherein in the privacy mode, content on the second display surface is not viewable at a second viewing angle outside the privacy angle, and wherein in the sharing mode, content on the first display surface is viewable at the second viewing angle outside the privacy angle.

9. The non-transitory computer-readable storage medium of claim 8, wherein the sensor comprises a first sensor and a second sensor, and wherein the program instructions, when executed, further cause the computing device to:

determine, using sensor data from the first sensor, an orientation of the computing device; and determine, using sensor data from the second sensor, an opening angle between the first and second members.

10. The non-transitory computer-readable storage medium of claim 9, wherein the program instructions when executed cause the computing device to, in response to determining the computing device is in a first orientation:

if the opening angle is less than a threshold value, select the privacy mode for the first display surface and the sharing mode for the second display surface, and if the opening angle is greater than the threshold value, select the privacy mode for both the first and second display surfaces.

11. The non-transitory computer-readable storage medium of claim 8, wherein the sensor comprises a first sensor disposed within the first member and a second sensor disposed within the second member, and wherein the program instructions when executed further cause the computing device to:

determine, using sensor data from the first sensor, a user presence in front of the first display surface; and determine, using sensor data from the second sensor, the user presence in front of the second display surface.

12. The non-transitory computer-readable storage medium of claim 11, wherein the program instructions when executed further cause the computing device to:

select the privacy mode for the first display surface in response to detecting the user presence using the sensor data from the first sensor; and select the privacy mode for the second display surface in response to detecting the user presence using the sensor data from the second sensor.

13. A method comprising:

determining, using first sensor data of a first sensor of a computing device, an opening angle between a first member of the computing device and a second member of the computing device rotatably connected to the first member;

determining, using second sensor data of an optical sensor, whether there is a user presence in front of a first display surface of the first member;

based on the opening angle and the determination of whether there is the user presence in front of the first display surface of the first member using the second sensor data of the optical sensor, selecting, by the computing device either a privacy mode or a sharing mode for the first display surface of the first member; and independently selecting, by the computing device, the privacy mode or the sharing mode for a second display surface of the second member.

14. The method of claim 13, wherein the optical sensor comprises an image sensor, an infrared sensor, or a time-of-flight sensor.

15. The method of claim 13, further comprising:

determining, using sensor data from an orientation sensor, an orientation of the computing device; and in response to determining that the computing device is in a specified orientation, selecting the privacy mode for both the first and second display surfaces.

16. The computing device of claim 1, wherein the processor is to:

determine, using sensor data from an angle sensor, an opening angle between the first and second members; and select the privacy mode or the sharing mode for the first display surface or the second display surface further based on the opening angle.

17. The method of claim 15, wherein the computing device in the specified orientation is in a book mode.

18. The method of claim 13, wherein in the privacy mode, content on the first display surface is not viewable at a first viewing angle outside a privacy angle that is a viewing angle, and wherein in the sharing mode, content on the first display surface is viewable at the first viewing angle outside the privacy angle.

\* \* \* \* \*